(12) United States Patent
Weidmann et al.

(10) Patent No.: US 7,670,525 B2
(45) Date of Patent: Mar. 2, 2010

(54) METHOD FOR FABRICATING A CURVED BEAM FROM COMPOSITE MATERIAL

(75) Inventors: Björn Weidmann, Borensberg (SE); Claes Rudqvist, Linköping (SE); Max Krogager, Linköping (SE); Mikael Petersson, Linköping (SE)

(73) Assignee: SAAB AB, Linköping (SE)

( * ) Notice: Subject to any disclaimer, the term of this patent is extended or adjusted under 35 U.S.C. 154(b) by 987 days.

(21) Appl. No.: 11/164,672

(22) Filed: Dec. 1, 2005

(65) Prior Publication Data

US 2006/0216480 A1    Sep. 28, 2006

(30) Foreign Application Priority Data

Dec. 6, 2004   (EP) .................................. 04028829

(51) Int. Cl.
*B28B 7/22* (2006.01)
(52) U.S. Cl. ................ 264/255; 264/247; 264/241; 264/257; 156/161; 156/221
(58) Field of Classification Search ................ 428/174; 156/221, 161; 264/255, 247
See application file for complete search history.

(56) References Cited

U.S. PATENT DOCUMENTS

| | | | | |
|---|---|---|---|---|
| 4,475,976 A | * | 10/1984 | Mittelstadt et al. | 156/286 |
| 4,576,849 A | * | 3/1986 | Gardiner | 428/119 |
| 4,789,416 A | * | 12/1988 | Ford | 156/222 |
| 4,955,803 A | * | 9/1990 | Miller et al. | 425/145 |
| 5,074,948 A | * | 12/1991 | Greffioz et al. | 156/361 |
| 5,223,067 A | * | 6/1993 | Hamamoto et al. | 156/173 |
| 5,648,109 A | | 7/1997 | Gutowski et al. | |
| 6,355,133 B1 | | 3/2002 | Williams | |
| 6,613,258 B1 | * | 9/2003 | Maison et al. | 264/102 |

(Continued)

FOREIGN PATENT DOCUMENTS

EP    0123225 A1    10/1994

OTHER PUBLICATIONS

European Patent Office—Communication—Sep. 25, 2008.

*Primary Examiner*—Steven P Griffin
*Assistant Examiner*—Jacob Thomas Minskey
(74) *Attorney, Agent, or Firm*—Venable LLP; Eric J. Franklin

(57) ABSTRACT

A method for fabricating a curved beam from fiber composite material. A flat fiber composite laminate including a plurality of layers and at least two different fiber directions is formed. The fiber composite laminate is disposed in contact with a male tool includes a first flange, a second flange and an intermediate web. The male tool is curved in its longitudinal direction with a radius of curvature in such a way that the first flange has a shorter longitudinal extent than the second flange. The fiber composite laminate is brought into contact with and secured to the first flange of the male tool. The male tool and the fiber composite laminate are then rotated relative to one another so that the fiber composite laminate is brought into contact with the intermediate web of the male tool in a first rotational movement, and brought into contact with the second flange of the male tool in a second rotational movement. The fiber composite laminate hardens on the male tool, and the finished beam is separated from the tool. Also a beam of fiber composite material fabricated according to the method.

6 Claims, 2 Drawing Sheets

U.S. PATENT DOCUMENTS

2003/0168775 A1* 9/2003 Eberth et al. ................ 264/258
2004/0074587 A1   4/2004 Koerwien et al.
2006/0249868 A1* 11/2006 Brown et al. ................ 264/163

* cited by examiner

METHOD FOR FABRICATING A CURVED BEAM FROM COMPOSITE MATERIAL

FIELD OF THE INVENTION

The invention concerns a method for fabricating a curved beam from fiber composite material. A flat fiber composite laminate comprising a plurality of layers and at least two different fiber directions is formed using the method according to the invention. The fiber composite laminate is disposed against a male tool comprising a first flange, a second flange and an intermediate web. The male tool is curved in its longitudinal direction with an angle of curvature R in such a way that the first flange has a shorter longitudinal extent than the second flange.

The invention also concerns a beam fabricated using the method according to the invention.

BACKGROUND OF THE INVENTION

There is major demand for extended beams that combine low weight with high strength, particularly in the aviation industry. Meter-long beams are made from fiber composite material to support curved structures in aircraft fuselages. These fiber composite beams are given a shape that corresponds to the curved structure. A curvature with a radius of curvature R is thus imparted to the beams along at least a part of the longitudinal extent of the beam.

A male tool against which the fiber composite material is shaped before hardening is used in fabricating curved beams. The male tool can consist of a metal tool with a rectangular cross-section shaped so that a curvature is obtained in the longitudinal direction. The male tool has a first flange/side and a second opposing flange/side, both of which are curved in such a way that the flanges are parallel along their entire extents. One problem associated with the fabrication of curved beams using this type of tool is that it is difficult to get a laminate comprised of layers of fibers with different fiber directions to follow the curvature of the beam when the curvature is large, i.e. the radius of curvature R is small. Using current fabrication methods, the beam is fabricated in that a laminate is applied over the intermediate web and then brought down over the flanges of the tool. This fabrication method gives rise to the formation of folds at the curved surface of the tool that comprises the inner curved surface, i.e. the surface that faces in toward the center of the radius of curvature R. To prevent folds from being formed in a first flange that is formed against the first flange of the male tool, small wedge-shaped pieces of material are cut from the composite layer in that area. However, this entails a major waste of material and degraded strength in the finished beam. Supporting layers can be applied to the slit surface of the beam to mitigate the strength problem. However, one disadvantage of such supporting layers is that they increase the weight of the finished beam, which is undesirable, particularly in an aviation context.

SUMMARY OF THE INVENTION

An object of the invention is to solve the foregoing problem.

The object is achieved by using a method of fabrication that comprises the steps of forming a flat fiber composite laminate comprised of a plurality of layers and at least two different fiber directions, the fiber composite laminate against a male tool comprised of a first flange, a second flange and an intermediate web, wherein the male tool is curved in its longitudinal direction with a radius of curvature R in such a way that the first flange has a shorter longitudinal extent than the second flange, applying and securing the fiber composite laminate to the first flange of the male tool, rotating the male tool and the fiber composite laminate relative to one another so that the fiber composite laminate is brought into contact with the intermediate web of the male tool in a first rotational movement, and brought into contact with the second flange of the male tool in a second rotational movement, hardening the fiber composite laminate on the male tool, and separating the finished beam from the male tool.

The invention also relates to a beam made from composite material in accordance with the aforementioned fabrication method.

The method according to the invention makes it possible to fabricate a beam with very little waste of material. Because the beam can be fabricated with no weak points in the form of slits, a beam with good strength properties is obtained.

BRIEF DESCRIPTION OF THE FIGURES

The invention, together with further objectives and advantages thereof, may best be understood by reference to the following description taken in conjunction with the accompanying drawings in which.

DETAILED DESCRIPTION OF THE INVENTION

The invention will be described below based on an embodiment in which the curved beam is shaped as a C-beam. It will be apparent that the same fabrication method can also be used for hat-shaped beams, Z-beams and I-beams.

Figure 1:
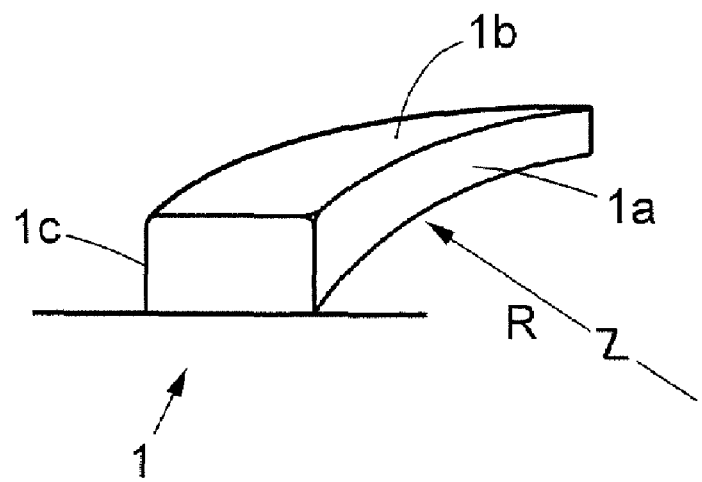
FIG. 1 shows a perspective view of a male tool.

FIG. 1 shows a perspective view of a male tool with a radius of curvature R. The tool can preferably consist of a homogeneous metal tool. Other materials and structures are of course also possible. The method according to the invention has been tested successfully using curve radii in excess of 2 meters and beam heights of up to 150 mm. It will be apparent to one skilled in the art that larger radii make it possible to work with higher beam heights while, in the same way, lower beam highs make it possible to work with smaller curve radii.

Figure 2:
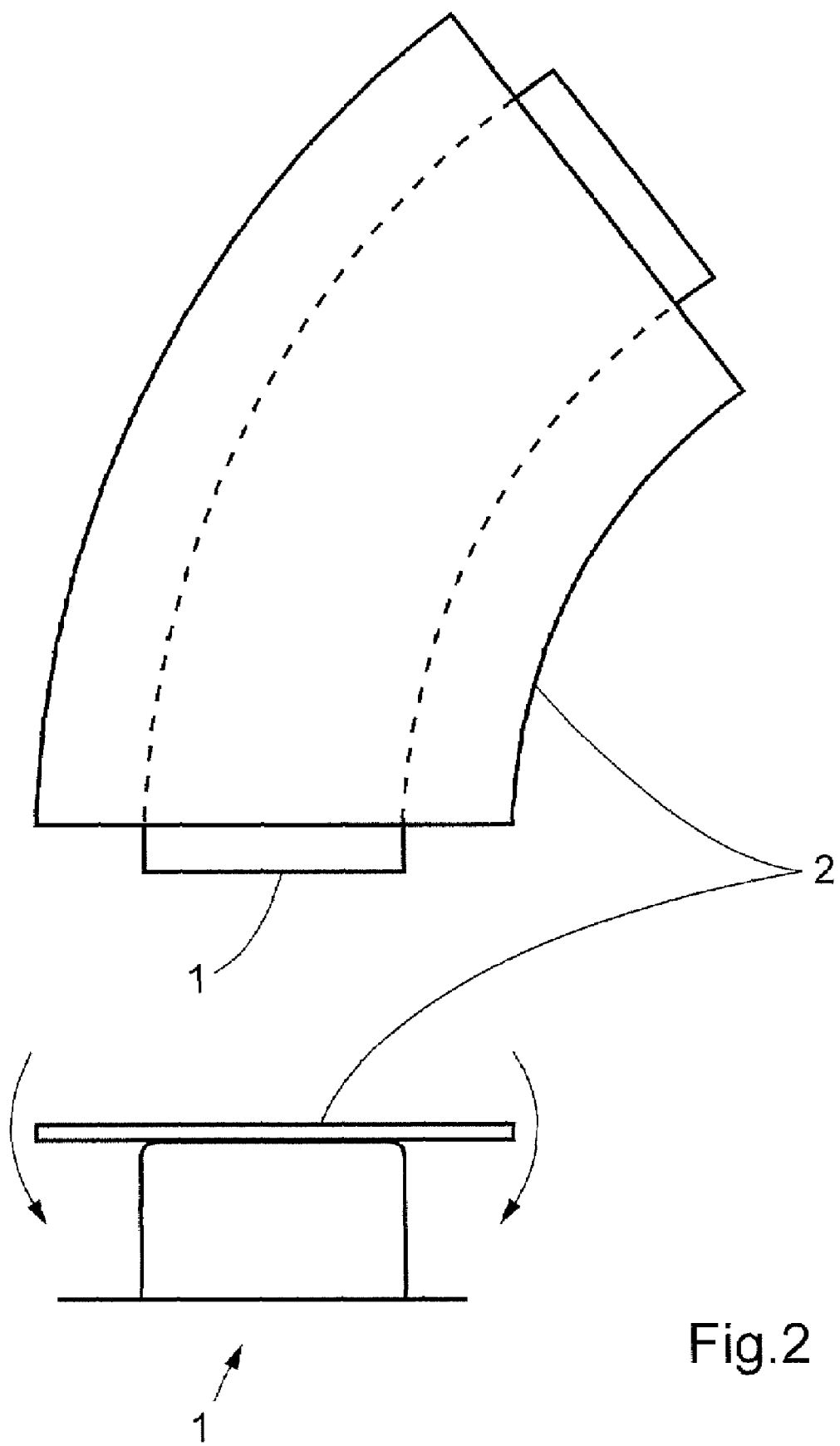
FIG. 2 shows a tool with fiber composite laminate applied before shaping including the shaping of curved beams according to the state of the art.

FIG. 2 depicts the shaping of a laminate 2 on a male tool 1 according to a prior art method. The laminate 2 is laid in contact with an intermediate web on the tool. The fiber composite laminate 2 is then brought down over each respective flange/side 1a, 1c of the tool so that the laminate 2 lies in contact with the entire extent of the tool. This known method causes folds to be formed at a first flange 1a of the tool, i.e. the side of the tool that forms the inner curve surface.

Figure 3:
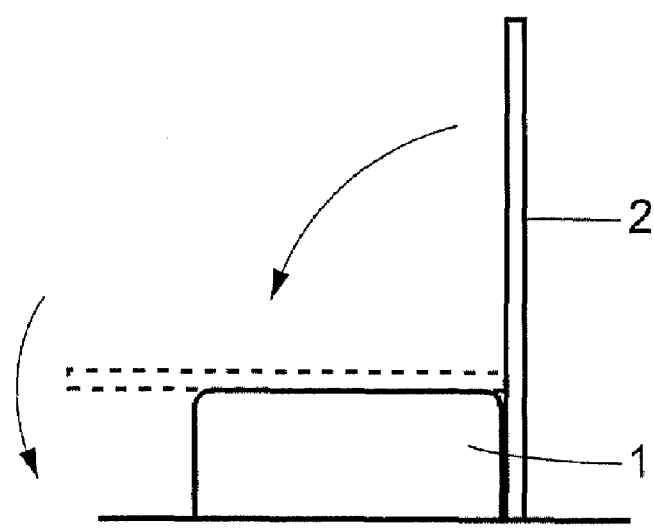
FIG. 3 shows the fabrication of curved beams using the method according to the invention.

FIG. 3 shows the shaping process as per the method according to the invention. A flat fiber composite laminate 2 is brought into contact with a first flange 1a of the tool 1 and secured at said first flange 1a. The fiber composite laminate 2 is then pressed down toward the intermediate web 1b of the male tool 1 so that the fiber composite laminate is stretched out over the entire intermediate web. This draping process can be performed while the male tool 1 is being rotated relative to the fiber composite laminate, with the fiber composite laminate 2 being kept still. Other types of relative movement between the tool 1 and laminate 2 are, however, also possible. Tensile stress will consequently occur in the fiber composite laminate 2. The tensile stress in the laminate 2 increases with increasing distance from the first flange 1*a*. The highest tensile strength occurs in that part of the fiber composite laminate 2 that is in contact with the edge of the second flange 1*c*. The fiber composite laminate 2 is then brought toward the second flange 1*c* on the male tool 1. The tensile stress in the stretched fiber composite laminate 2 causes the laminate 2 to be pressed against the second flange 1*c*. After being draped onto the tool, the fiber composite 2 hardens to form a finished beam, e.g. via hardening in an autoclave. The finished beam is then removed from the tool 1.

The method according to the invention produces elongation of the laminate 2 so that the fiber density in the part of the laminate 2 that lies in contact with the second flange 1*c* is lower per unit of area than the fiber density in that part of the laminate 2 that lies in contact with the first flange 1*a*. Elongation of the material can be achieved by securing the fiber composite laminate 2 at the first flange 1*a* before the laminate 2 is draped over the tool. This elongation eliminates the known problem of fold formation associated with prior methods, while at the same time retaining high strength and low weight.

The method according to the invention has been described for the fabrication of a so-called C-beam. The method can however also be used to produced hat-shaped beams, Z-beams and I-beams. The method is applicable primarily to larger beams such as occur in an aviation context, and where a combination of high strength and low weight is essential.

The foregoing description of the preferred embodiments of the invention has been presented for purposes of illustration and description. It is not intended to be exhaustive or to limit the invention to the precise forms disclosed, since many modifications or variations thereof are possible in light of the above teaching. It is therefore the intention that the following claims not be given a restrictive interpretation but should be viewed to encompass variations and modifications that are derived from the inventive subject matter disclosed.

What is claimed is:

1. A method for fabricating a curved beam from fiber composite material, the method comprising:

forming a flat fiber composite laminate comprising a plurality of layers and at least two different fiber directions, arranging the fiber composite laminate against a male tool comprising a first flange, a second flange and an intermediate web, wherein the male tool is curved in a longitudinal direction with a radius of curvature such that the first flange has a shorter longitudinal extent than the second flange, applying and securing a first surface of the fiber composite laminate along a length of the first flange of the male tool, rotating the male tool and the fiber composite laminate relative to one another about an axis extending in the longitudinal direction of the fiber composite laminate so that the fiber composite laminate is brought into contact with the intermediate web of the male tool in a first rotational movement, and brought into contact with the second flange of the male tool in a second rotational movement, hardening the fiber composite laminate on the male tool, and separating the finished beam from the male tool, wherein the fiber composite laminate is stretched over the intermediate web during the first rotational movement so that a fiber density per unit of area becomes lower in a portion of the fiber composite laminate that is arranged in contact with the second flange than in a portion of the fiber composite laminate that is arranged in contact with the first flange.

2. The method according to claim 1, wherein the flat fiber composite laminate is laid up in equipment for automatic tape lay-up.

3. The method according to claim 1, wherein the curved beam is shaped as a C-beam.

4. The method according to claim 1, wherein the curved beam is shaped as a Z-beam.

5. The method according to claim 1, wherein the curved beam is shaped in a hat shape.

6. The method according to claim 1, wherein the curved beam is shaped as an I-beam.

* * * * *